July 14, 1970   A. J. FLOCCHINI   3,520,280
AUTOMATIC ANIMAL FEEDER
Filed May 15, 1968
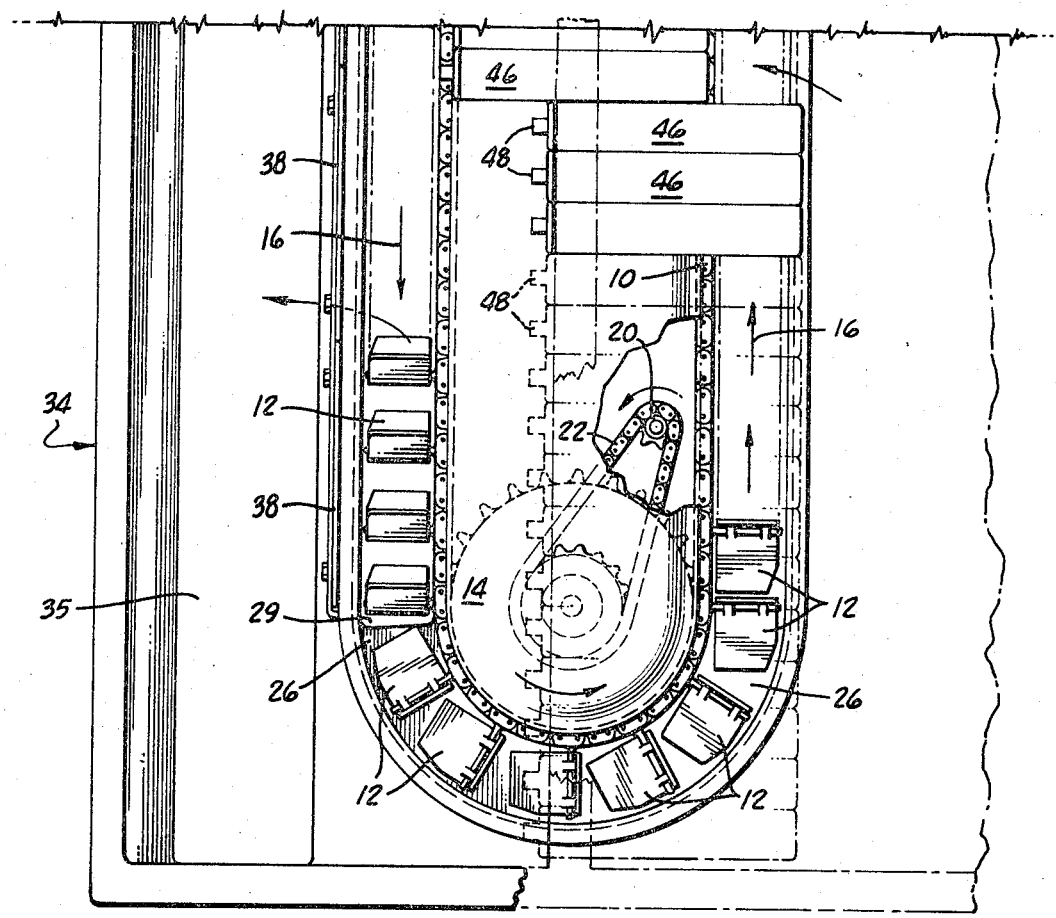
FIG_2
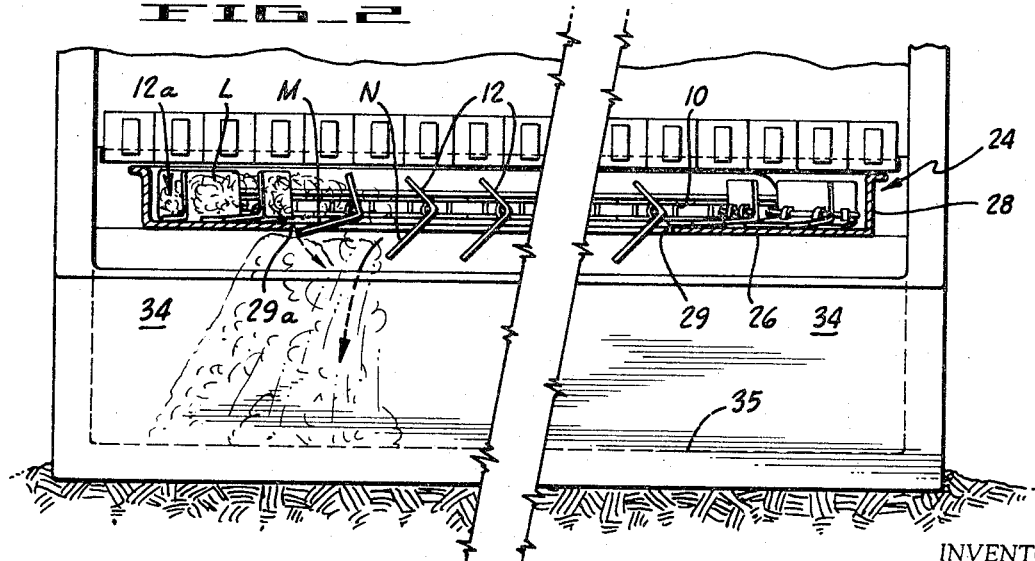
FIG_3
INVENTOR.
ANDREW J. FLOCCHINI
BY
Townsend and Townsend
ATTORNEYS United States Patent Office 3,520,280
Patented July 14, 1970

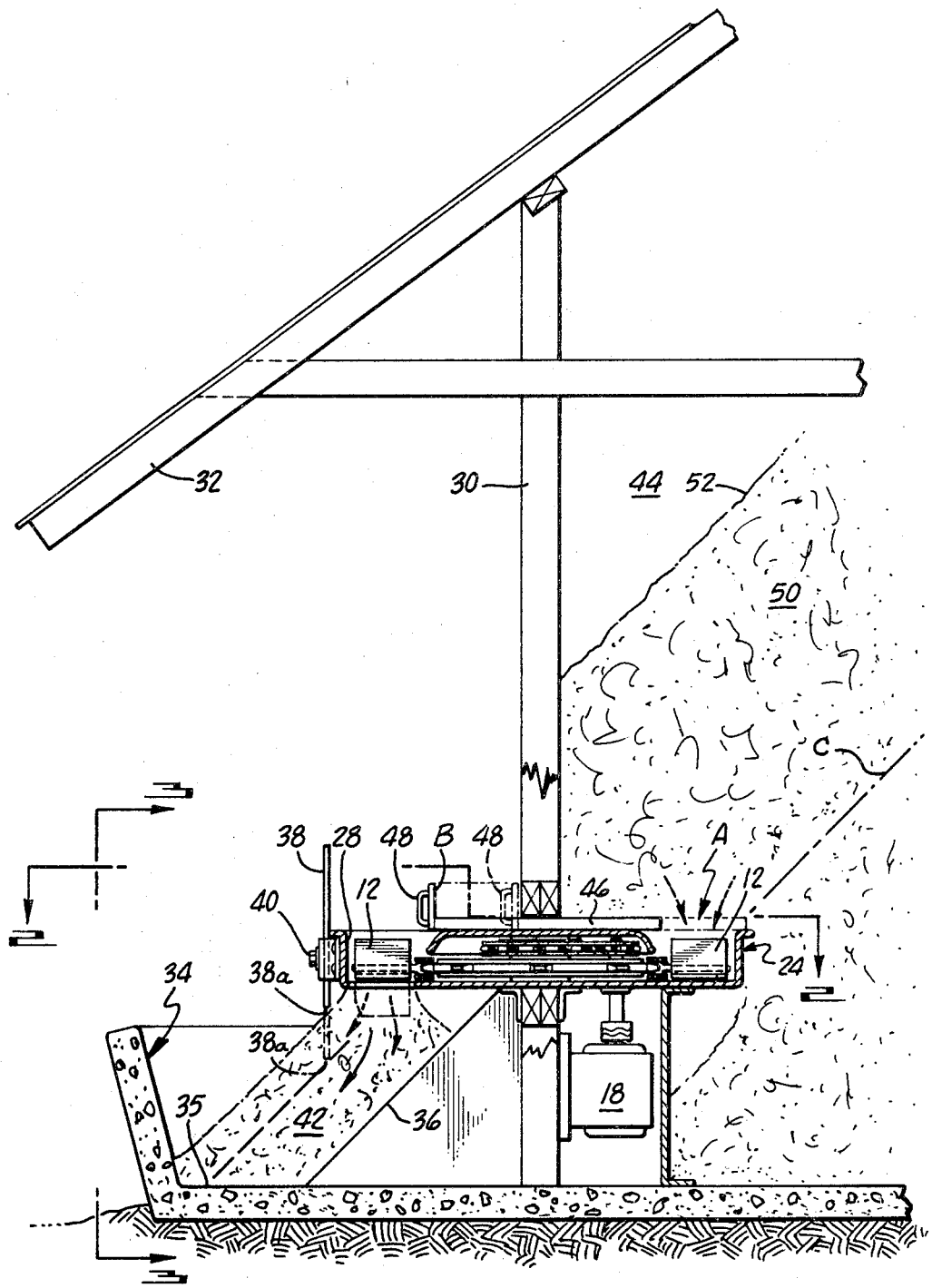
FIG_1

3,520,280
AUTOMATIC ANIMAL FEEDER
Andrew J. Flocchini, Petaluma, Calif., assignor to Phillips Petroleum Company, a corporation of Delaware
Filed May 15, 1968, Ser. No. 729,241
Int. Cl. A01k 5/02
U.S. Cl. 119—56                                 7 Claims

ABSTRACT OF THE DISCLOSURE

An automatic animal feeding apparatus in which a series of L-shaped paddles are pivotally mounted on an endless chain, with a feed supply located above the conveyor for gravity feed to the paddles. The amount of feed falling on the paddles is controlled by a series of individually movable slats which permit progressive access to the feed supply. As the paddles reach the discharge station they tilt downward and discharge the load of feed into a feeding trough. A feed level control plate is positioned so that the feed falls between it and the feed trough. When the feed reaches the desired level determined by the vertical placement of the plate, it will fill the space between the trough and plate causing the paddles to ride on the surface without discharging feed.

---

This invention relates to automatic animal feeders and more particularly to an automatic hay feeder.

Automatic hay feeders are well-known. In the feeders of which I have knowledge it is the usual practice to utilize an auger for distributing the hay from the storage area to the feed trough. Auger type feeders have the distinct disadvantage that the hay will not feed properly to the animals unless it is piled directly along the length of the auger. This requires extensive hand labor by the dairy farmer in shoveling the hay against the feed auger. Even if a gravity feed arrangement such as a sloping floor were used to supply the auger, the hay would still not be distributed evenly. Still another disadvantage of the auger-type feeds is their tendency to break up the hay into small fragments usually called "fines."

Cattle prefer eating whole hay to "fines." In the usual hay cubes, that is, compressed alfalfa hay, there is some breakdown of hay into fragments or fines. It the cattle are permitted to feed freely or "free choice," they will tend to consume the whole hay leaving the fines in the trough. The cattle then move on to areas of the trough where the whole hay is not yet consumed. If the fines are not consumed each day, there is a tendency for the feed to become moldy because of the wetting of the fines by the saliva of the cattle which have been feeding at the trough.

The present invention was designed to overcome both the difficulty experienced with uniform feeding from the storage area by auger-type feeders and the consumption of fines by the cattle from the feeding troughs. This is accomplished in the present invention by the use of a chain conveyer carrying L-shaped paddle type feed receptacles in a continuous path. The feed receptacles are pivotallly mounted on the continuous chain so that when they reach a discharge station they may tilt downward to discharge the feed. Adjacent the travel path of the paddles is a vertically-disposed feed control plate which is vertically adjustable with respect to the feed trough below the conveyor path. Thus when the feed is discharged from the receptacles, it will fall into the feed trough and inside the feed control plate. When the feed level reaches the edge of the plate, no additional feed will fall into the trough, but will accumulate between the plate and the bottom of the trough, rising in level until reaching the bottom of the conveyor. Because the feed receptacles have flat bottoms that will ride on the top surface of the accumulated feed thus no longer discharging feed. The flat bottom of the feed conveying receptacles riding smoothly over the top of the feed will present the breaking up of the hay into fines and the resultant loss of food material for the cattle.

The present invention also incorporates a novel form of gravity feed supply onto the feed conveyor heretofore described. The feed storage area is located above the conveyor arrangement and is provided with a novel feed control closing off the top of the conveyor. The control arrangement comprises a plurality of movable slats which cover the entire length of the conveyor chain. The gravity feed of the hay is accomplished by sliding several of the slats so that there is an opening from the feed storage area through which the hay may fall directly onto the paddles of the conveyor chain. As the supply of hay is diminished, additional slats are opened to permit the hay to continue to fall onto the conveyor paddles. Only a relatively few of the slats are opened at a time in order to preclude overloading of the conveyors with the subsequent breaking up of the hay into fines.

The conveyor drive motor may be connected with a timer so that the feed supply may be replenished periodically as the cattle require, without the necessity of regular attendance by the dairyman. A further refinement would be the provision of a control switch responsive to the accumulated feed level below the conveyor. When the level dropped sufficiently, the conveyor would be actuated so that there would always be sufficient feed in the feed trough.

The particular configuration of this apparatus encourages the cattle to consume the fines in order to be assured of a regular supply of whole hay. This is a natural consequence of the arrangement by which the fines fall to the bottom of the sloping back wall of the manger and the whole hay tends to cover the fines. Unless the cattle consume both the upper layer of whole hay and some of the fines below, the amount of whole hay falling from above onto the layer of fines will decrease. Thus the cattle are assured of a regular supply of whole hay when they consume both the whole hay and the fines from the feed manger.

In the drawings, FIG. 1 is a partial elevation of one portion of a cattle feed barn provided with the automatic feeding apparatus of the present invention, the view being in partial section as well;

FIG. 2 is a plan view of the conveyor, partially broken away, taken along lines 2—2 in FIG. 1; and FIG. 3 is a side elevation of the conveyor showing how the feed is discharged from the conveyor, the view being taken along the lines 3—3 in FIG. 1.

Referring now more particularly to the drawings in which the same reference figures refer to identical parts in each of the several views, the layout of the animal feeder is shown generaly in FIG. 1. The conveyor apparatus comprises a continuous chain 10 to which a series of L-shaped paddles 12 are pivotally mounted. A drive sprocket 14 engages the chain to move the chain and its attached paddles along the continuous path marked 16. The drive sprocket 14 is driven by an electric motor 18 through a drive sprocket 20 and drive chain 22. An idler sprocket (not separately shown), equivalent in size to drive sprocket 14, is located at the opposite end from the drive sprocket 14 so that the chain follows a continuous path. The entire conveyor arrangement is mounted in a shallow housing 24 having a flat floor 26 and upstanding sidewalls 28. In one portion of the floor 26 there is a cutaway area 29 forming a discharge station where the conveyor paddles 12 discharge their load. The operation thereof will be described below.

As may be more clearly seen in FIG. 1, the conveyor apparatus is mounted in the wall 30 of the barn structure. The barn is provided with a substantially overhanging roof 32 to protect the feeding area from inclement weather. Under the eaves 32 and located directly beneath the conveyor is the feeding trough or manger 34. The manger 34 has a sloping back wall 36 at an angle of approximately 45° to the ground. The back wall 36 is located under the conveying apparatus so that the discharged hay falls onto the back wall and accumulates under the discharge station 29.

Affixed along the outboard edge of the shallow housing 24 is a feed control plate 38. The preferable means of mounting the control plate 38 is by bolts 40 which pass through elongated slots in the plate thus permitting vertical movement of plate 38. The feed control plate 38 is vertically movable to control the depth of feed 42 which may accumulate in the manger 34 upon discharge from the conveyor.

The loading portion of the conveyor comprises a series of individually movable gates or slats 46 which cover the portion of the conveyor apparatus located inside the hay storage area 44. These slats 46 are provided with handles 48 to permit them to be moved individually in and out of the wall. This uncovers a portion of the conveyor apparatus so that hay from the hay storage area may fall onto the conveyor paddles 12.

The operation of the apparatus is as follows: The hay storage area 44 is filled with hay cube 50 until it reaches the desired level 52 such as that shown in FIG. 1. Initially, all the slats 46 are in the closed position so that the portion of the conveyor housing 24 located within the hay storage area is completely covered. A few slats 46 are moved from the closed position shown by the dotted lines at A in FIG. 1 to the open position B. Hay will drop through the opening thus created and onto the conveyor paddles 12.

The motor 18 may then be energized either through a switch or through a timing mechanism (not shown). A timing arrangement is used in order to automatically provide for feeding of the cattle when other activities might prevent the dairyman from being in attendance. The motor 18 will turn the conveyor drive sprocket 14 thus starting the endless chain 10 around the path 16 in the housing 24. The L-shaped paddles 12 will fill with hay falling by gravity through the opening created by the slats 46 which have been moved. Only a relatively few of the slats 46 are opened at a time so that too much hay will not fall onto the conveyor paddles 12 which might cause the paddles to break or cause the hay to be broken up into fines.

As the conveyor moves around the path 16, the hay cube falling onto the paddles from the supply 50 will be carried around to the cutaway area 29 serving as a discharge station. When the loaded paddles 12a reach the leading edge 29a of the discharge station, the pivotally-mounted paddles tend to pivot downward under the weight of the load of hay cube. If there is little or no feed in the manger 34, the entire load of hay cube will be dropped onto the back wall 36 of the manger, sliding to the floor 35 of the manger.

As may be seen in FIG. 1, the hay 42 will accumulate in the manger until it reaches the bottom edge 38a of the feed control plate. The hay will then accumulate directly under the conveyor discharge station. When this occurs, the conveyor paddles will no longer discharge hay cube since the bottom surface of the paddle will ride along the top of the hay already discharged. An illustration of this is shown in FIG. 3.

In FIG. 3 the loaded paddle marked L is riding along the upper surface of the hay which has accumulated in the manger. The paddle marked M is tilting over since the hay level has not yet reach a height sufficient to hold the paddle in an approximately horizontal position. Paddle N, as will be seen, has completely discharge its hay into the manger as have the unmarked paddles which preceded paddle N into the discharge station.

The feed level in the manger is controlled by the vertical position of the feed control plate 38. In FIG. 1, dashed lines at feed plate indicate how lowering the plate so that the lower edge 38a is closer to the back wall 36 of the manger will lower the depth of hay 42 in the manger. The vertical adjustment of the feed control plate serves several functions. First, the amount of feed in the manger may be controlled by lowering the plate so that if fewer cattle are to be fed, less feed will be loaded into the manger by the conveyor apparatus. Further, if the cattle have a tendency to eat the whole cube rather than the fines which are in the manger, the feed control plate may be lowered so that less whole cube is added as the cattle eat the feed in the manger. For example, in normal handling, approximately 10% of the cubed hay comprises the fines. Since the cattle prefer eating the whole cubed hay, the level of fines at the bottom of the manger will build up. Thus, with the feed control plate at the same level, less whole cubed hay will be added into the manger because of the accumulation of fines below the whole cubed hay. Thus, if the cattle want to eat whole hay, they will be forced to consume some of the fines so that additional whole hay will be dropped into the manger from the conveyor.

The gravity feed of the hay cube in the storage area will continue until the feed reaches the level shown by the dashed line C in FIG. 1. By successive opening of the slats 46, the entire length of the hay storage area 44 will be depleted of hay down to the level of the dashed line C. At this point the dairyman may close a number of the slats and, either by hand or by means of a tractor, reload the hay beyond the line C onto the top portion of the conveyor and resume the automatic feeding as described above.

Although the foregoing invention has been described in some detail by way of illustration for purposes of clarity of understanding, it will be apparent to one skilled in this art that certain changes and modificatons may be practiced within the spirit of this invention as limited only by the scope of the appended claims.

I claim:
1. An automatic animal feeding apparatus comprising conveying means adapted for discharge of solid animal feed by gravity; feed storage means for supplying solid animal feed to the conveying means; adjustable control means for regulating the quantity of solid feed being supplied to the conveying means; a feed discharge station; a feed-receiving receptacle positioned to receive the discharge of the conveyor means; feed level control means adjacent the conveyor means and positionable vertically with respect to the feed-receiving receptacle to maintain the feed level in the receiving receptacle at a preselected height, said feed level control means comprising an elongate plate mounted along the discharge station and adjustable vertically with respect to the receiving receptacle, the feed being discharged between the plate and the receiving receptacle so that the feed level is controlled by the vertical placement of the plate; the conveyor means comprising a plurality of pivotally mounted receptacles adapted to discharge the receptacle contents by pivoting downward from a normally horizontal position when the receptacles reach the feed discharge station; and wherein the feed discharge accumulates between the plate and the receiving receptacle and below the discharge station so that when the feed accumulates to the height of the discharge station the conveyor receptacles are maintained in substantially horizontal position so that no feed may be discharged thereby.

2. The apparatus of claim 1 and wherein the feed conveying receptacles have a substantially L-shaped cross-section with the elongate leg traveling horizontally, the receptacles being pivotally mounted so that the horizontal leg may pivot downward to discharge feed when it reaches the discharge station, the conveying receptacles being disposed so that the horizontal leg rests upon the accumulated feed between the plate and the receiving receptacle, the conveying receptacle being prevented thereby from discharging additional feed.

3. The apparatus of claim 1 and including means for actuating the conveying means, said means being responsive to preselected depths of feed in the feed-receiving receptacle.

4. The apparatus of claim 1 and including means for actuating the conveying means for preselected periods of time.

5. Apparatus for dispensing animal feed comprising: conveyor means adapted to move particulate animal feed from a storage bin to a feeding trough, said conveyor means having an opening therein for discharging feed into a feeding trough; a storage bin for holding a quantity of particulate feed and supplying the feed to the conveyor means; a feeding trough for receiving the feed discharge of the conveyor means; feed height control means associated with the feeding trough for regulating the height of the accumulated feed in the feeding trough, said feed height control means being vertically adjustable and positioned with respect to the feeding trough so that the feed being discharged by the conveyor means will accumulate in depth adjacent the feed height control and below the conveyor means; and conveyor discharge control means responsive to the height of the accumulated feed below the conveyor means, said discharge control means closing the discharge opening when the depth of the accumulated feed is equal to the distance between the discharge opening and the feeding trough.

6. The dispensing apparatus of claim 5 wherein the conveyor discharge control means comprises a plurality of feed carriers carried by the conveyor means past the discharge opening, said feed carriers movable to dispense the feed when the depth of the accumulated feed drops substantially below the level of the opening and keep the discharge opening closed when the feed level is adjacent the opening.

7. The apparatus of claim 5 and including means for controlling the amount of feed being supplied to the conveyor means, said controlling means comprising a plurality of individually movable gates between the conveyor means and the storage means, said gates being selectively operable to permit additional feed to be supplied to the conveyor means.

References Cited
UNITED STATES PATENTS

| | | | |
|---|---|---|---|
| 2,867,314 | 1/1959 | Hansen | 119—52 X |
| 2,934,199 | 4/1960 | Winkler | 119—52 |
| 3,013,529 | 12/1961 | Parker et al. | 119—53 |
| 3,024,765 | 3/1962 | Reed | 119—52 |
| 3,028,838 | 4/1962 | Haggard et al. | 119—53 X |
| 3,077,972 | 2/1963 | Mitchell | 119—52 X |
| 3,123,049 | 3/1964 | Cordis | 119—52 |
| 3,159,142 | 12/1964 | Bares et al. | 119—52 |
| 3,230,933 | 1/1966 | Myers et al. | 119—53 |

ALDRICH F. MEDBERY, Primary Examiner

U.S. Cl. X.R.

119—53

UNITED STATES PATENT OFFICE
CERTIFICATE OF CORRECTION

Patent No. 3,520,280            July 14, 1970

Andrew J. Flocchini

It is certified that error appears in the above identified patent and that said Letters Patent are hereby corrected as shown below:

In the heading to the printed specification, lines 3 and 4, cancel "assignor to Phillips Petroleum Company, a corporation of Delaware".

Signed and sealed this 19th day of January 1971.

(SEAL)
Attest:

Edward M. Fletcher, Jr.
Attesting Officer

WILLIAM E. SCHUYLER, JR.
Commissioner of Patents